July 9, 1935.  H. ROBERTS  2,007,836
REFRIGERATOR TRUCK COOLING APPARATUS
Filed Nov. 1, 1934
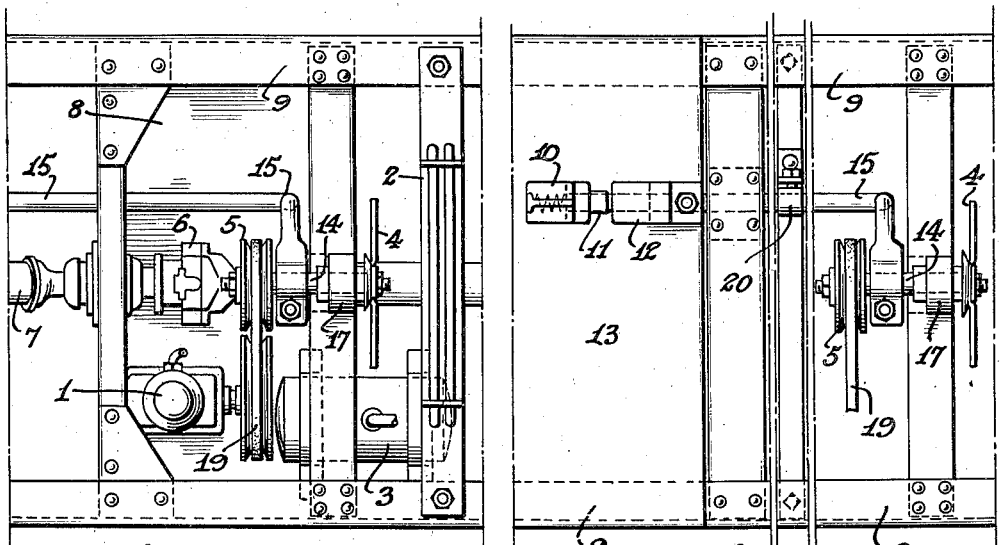
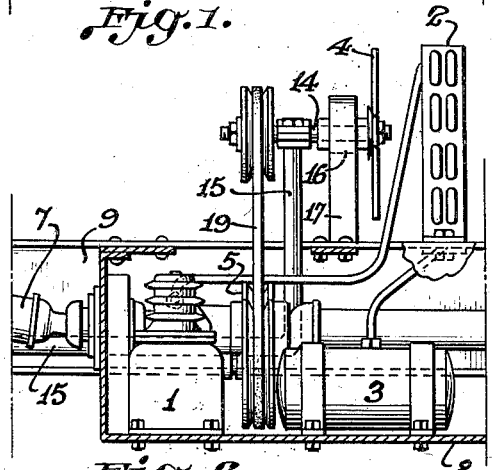
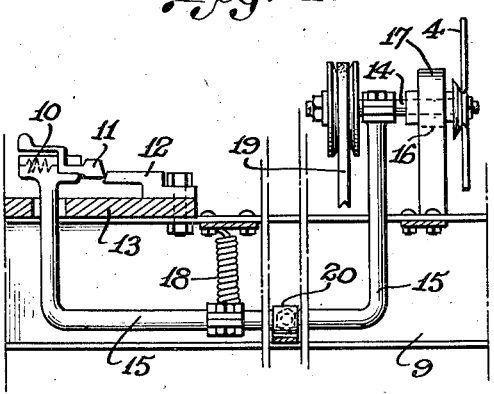
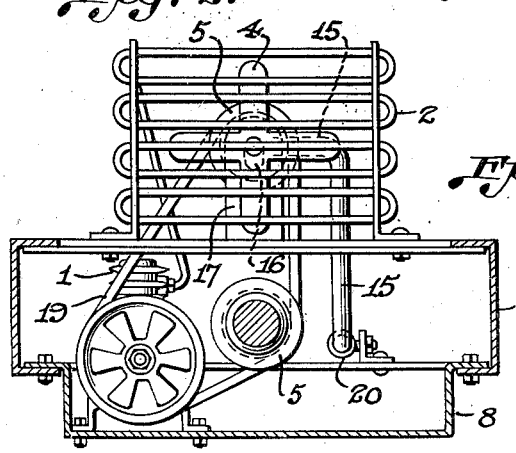
Inventor:
Herbert Roberts Patented July 9, 1935

2,007,836

UNITED STATES PATENT OFFICE 2,007,836

REFRIGERATOR TRUCK COOLING APPARATUS

Herbert Roberts, Chicago, Ill., assignor of one-half to Maurice Wiseman, Pittsburgh, Pa.

Application November 1, 1934, Serial No. 751,040

1 Claim. (Cl. 62—117)

This invention relates to the manner of mounting a compressor and a condenser, associated with a refrigerating system, on a vehicle, and especially to the manner of driving said compressor.

Mechanical refrigeration in vehicles of this kind is common, but heretofore, as far as I am aware, the compressor used in such systems is driven by a separate engine located at any suitable place on the body of the vehicle.

The principal object of this invention is to obviate the necessity of such extra engine, and contemplates driving the compressor directly from the crankshaft of the engine which propels the vehicle itself.

Another object of this invention is to so mount the compressor that the refrigerating system can readily be operated if necessary, from an outside source of power, and that slack in the driving belts may be taken up without the use of a belt tightener or similar device.

A further object is to accomplish these results without the necessity of in any way changing the design of the engine or other parts of such vehicle as now built by the manufacturer.

Other features inherent in this invention will be apparatus from a detailed description of the same hereinafter.

The mounting of the refrigerating equipment in between the frame in a compact form occupying the least room possible is one feature as illustrated in the accompanying drawing.

Figure 1 is a plan of part of the frame and the mounting of the refrigerating equipment;

Fig. 2 is a side sectional elevation;

Fig. 3 is a front sectional elevation;

Fig. 4 is a plan describing the stop and starting of the equipment; and

Fig. 5 is a sectional elevation of Fig. 4.

I have not attempted in my drawing to show the refrigerated compartment of the truck as that is common and is determined by the product carried. I am only showing the part of the frame where the equipment is mounted directly behind the driver's cab, and is adaptable to any motor vehicle.

In Fig. 1, a part plan of the placing of the refrigerating equipment, can be seen the compressor 1, condenser 2, liquid condenser 3 and the mounting of the fan 4. It also shows the motive power furnished by the wheel 5 mounted on the end of the first universal 6 of the driveshaft 7.

In Fig. 2, a part sectional elevation, can be seen the steel braces 8 which hold the equipment and show the method of fastening the same to frame 9.

In Fig. 3, a part front sectional elevation shows the bracing of the condenser and the method of enclosing equipment in frame 9.

In Fig. 4 is a plan illustrating the method of stopping and starting refrigerating equipment.

From Figure 5, it can be seen that by stepping on pedal 10 a spring lock 11 catches in fastener 12 which is mounted on floorboard 13 near the driver's seat. This view shows a pivot 20 mounted along a horizontal portion of the rod 15 and to the right of spring 18. The action of this pivot on the rod 15 will cause the fan shaft 14 to rise in slot 16 and tighten belt 19 when the pedal 10 is pressed down; and when pedal 10 is released, spring 18 will cause the right hand extremity of rod 15 to be lowered pulling down shaft 14 and slot 16 and causing belt 19 to slacken.

Obviously, numerous changes could be made without departing from the scope of this invention, and I do not wish to be limited to the precise construction illustrated in the drawing.

Having thus described my invention, what is claimed is:

In combination with the drive shaft of a motor vehicle, a refrigerating system including a compressor, a support for the compressor, a chassis for said vehicle, said support being suspended below said chassis and supporting said compressor entirely below said chassis, a condenser and a fan for blowing air over said condenser, said condenser and fan being located above said chassis, a fly wheel-pulley associated with said compressor, said fly wheel pulley having a built in fan, a pulley mounted associated with said condenser fan, and a single belt cooperating with said drive shaft, said fly wheel pulley and said condenser fan pulley, said condenser fan pulley having a manual connection for connecting or disconnecting the compressor to or from the drive shaft of the motor vehicle in accordance with the refrigeration demand.

HERBERT ROBERTS.